United States Patent [19]
Haase et al.

[11] Patent Number: 5,942,692
[45] Date of Patent: *Aug. 24, 1999

[54] CAPACITIVE PRESSURE SENSING METHOD AND APPARATUS AVOIDING INTERELECTRODE CAPACITANCE BY DRIVING WITH IN-PHASE EXCITATION SIGNALS

[75] Inventors: Wayne C. Haase, Acton, Mass.; Paul M. Chizinski, New Ipswich, N.H.; Leonid Mindlin, South Natick, Mass.; Kerry S. Lahey, Litchfield, N.H.

[73] Assignee: MKS Instruments, Inc., Andover, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/835,668

[22] Filed: Apr. 10, 1997

[51] Int. Cl.$^6$ .............................. G01L 9/12; G01R 27/26
[52] U.S. Cl. ........................ 73/724; 361/283.4; 324/661; 324/680
[58] Field of Search ................... 73/724, 718; 361/283.4; 324/661, 662, 679, 680, 665, 672

[56] References Cited

U.S. PATENT DOCUMENTS

| | | | |
|---|---|---|---|
| 2,178,471 | 10/1939 | De Bruin | 73/724 |
| 3,497,801 | 2/1970 | Clower | 324/60 |
| 3,783,374 | 1/1974 | Eide et al. | 324/60 |
| 3,948,102 | 4/1976 | Coon | 73/724 |
| 4,398,426 | 8/1983 | Park et al. | 73/724 |
| 4,823,603 | 4/1989 | Ferran et al. | 73/724 |
| 5,087,866 | 2/1992 | Smith | 318/653 |
| 5,233,875 | 8/1993 | Obermeier et al. | 73/718 |
| 5,656,780 | 8/1997 | Park | 73/724 |

OTHER PUBLICATIONS

Harrison, D. R. and J. Dimeff (1973) "A Diode–Quad Bridge Circuit for Use with Capacitance Transducers" *Rev. Sci. Instrum.* 44 (10): 1468–1472.

Kaplan, B. et al. (1978) "An Instrument for Continuously Measuring Capacitance Changes" *IEEE Transactions on Instrumentation and Measurement* IM–27 (1):43–45.

*Primary Examiner*—Joseph L. Felber
*Attorney, Agent, or Firm*—Lappin & Kusmer LLP

[57] ABSTRACT

A capacitive pressure sensor includes a chamber coupled to a region whose pressure is to be determined. The sensor includes a conductive flexible diaphragm and a pair of electrodes, each defining a capacitance with the diaphragm. Variations in pressure in the chamber cause deflection of the diaphragm which in turn causes variation in the capacitances. A processing circuit applies an excitation signal to the capacitances and couples the capacitances to inductive elements. A current through the inductive elements is detected to determine the difference in the sensor capacitances and, therefore, the deflection of the diaphragm and the pressure in the chamber.

46 Claims, 6 Drawing Sheets

CAPACITIVE PRESSURE SENSING METHOD AND APPARATUS AVOIDING INTERELECTRODE CAPACITANCE BY DRIVING WITH IN-PHASE EXCITATION SIGNALS

FIELD OF THE INVENTION

The present invention relates generally to pressure transducers and more particularly to capacitive pressure transducers which sense capacitance to determine pressure.

BACKGROUND OF THE INVENTION

Capacitive transducers are used in many settings to detect pressure. Typically, a sensor includes a port connected to a region whose pressure is being measured. The sensor port is coupled to a chamber within the sensor. An electrically conductive flexible diaphragm is typically disposed within the chamber such that it is deflected by pressures applied to its face. One or more conductive electrodes can be located in proximity to the flexible diaphragm to form one or more capacitances between the electrodes and the diaphragm. As the chamber pressure changes, the diaphragm deflects, causing a change in the capacitances. A processing or detection circuit is typically connected to detect the change in capacitance, which is then related to the pressure in the chamber.

In one prior system, the processing circuitry includes an array or "bridge" of four diodes, referred to as a "diode quad bridge." Such a system is described in, for example, H. R. Dean and J. Dimeff, "A Diode-Quad Bridge Circuit for Use with Capacitance Transducers," *Rev. Sci. Instrum.*, vol. 44, no. 10, October, 1973. In that processing circuit, the sensor capacitances are connected to opposite nodes of the diode bridge. An oscillator applies an AC excitation signal across the diodes, and a resulting AC signal is applied across the capacitances. An output voltage, which is indicative of the sensor capacitances, is measured across the remaining two opposite nodes of the diode bridge. Such systems are typically operated at frequencies around 10 kHz and produce output signals at low levels. Extra amplification circuitry is typically required, and a high signal-to-noise (SNR) ratio is difficult to obtain.

In another conventional approach, a transformer is used to couple an AC excitation to the sensor capacitances. The center of the transformer secondary is tapped and the signal at the tap is monitored. When the capacitances are balanced, no AC signal is present at the center tap. However, imbalance in the capacitances causes an AC signal to appear at the center tap. A synchronous rectification and detection scheme is applied to analyze the AC signal. The amplitude of the signal is used to indicate the difference in capacitance between the capacitors which is related to the pressure being measured.

In this transformer approach, a low-frequency drive signal is used because of the slow response of the transformer. The low frequency necessitates larger components which limit the usefulness of the circuit where small size is desirable.

OBJECTS OF THE INVENTION

It is a general object of the present invention to provide an improved capacitive pressure transducer which substantially overcomes or reduces the problems of the prior art.

Another more specific object of the invention is to provide a pressure sensor having improved signal-to-noise ratio.

It is still another object of the invention to provide a pressure sensor with improved overall performance, with a reduced size and at lower cost than prior transducers.

It is still another object of the invention to provide a processing circuit for a capacitive pressure sensor which operates at higher frequency than prior systems, and, therefore, provides increased sensitivity, SNR and overall performance.

It is yet another object of the invention to provide a processing circuit for a capacitive pressure sensor which implements an improved linearization method.

SUMMARY OF THE INVENTION

These and other objects are realized by the pressure sensing apparatus and method of the invention. The capacitive pressure sensor of the invention includes a chamber to which are coupled first and second capacitances such that variations in pressure within the chamber cause the capacitances to vary. The capacitances are coupled to a processing circuit which includes an excitation circuit for applying an excitation to the capacitances. The processing circuit also includes an inductive element, such as an inductor, coupled to the capacitances such that a current flows through the inductor upon application of the excitation to the capacitances, the current being indicative of the difference between the first and second capacitances. The difference in capacitance is in turn indicative of the pressure in the chamber. A detector in the processing circuit detects the current through the inductor and generates a signal indicative of the pressure in the chamber.

In one embodiment, the capacitive pressure sensor of the invention includes an electrically conductive flexible diaphragm coupled to the chamber such that it is deflected in response to variations in the chamber pressure. The capacitances can be formed by placing electrodes in proximity to the conductive diaphragm. In one embodiment, two electrodes which are insulated from each other are located in proximity to the diaphragm. The first capacitance is formed of one of the electrodes and the diaphragm, and the second capacitance is formed of the second electrode and the diaphragm. Hence, each of the two capacitances share the diaphragm as one of its electrodes. As the pressure in the chamber varies, the diaphragm is deflected, changing the capacitance of both of the capacitors.

The capacitors are coupled to the processing circuit which provides a driving signal and detection circuitry to detect the changing capacitance with pressure. The difference in capacitance between the two capacitors is related to the amount of deflection, and, therefore, the pressure in the chamber.

In one embodiment, the electrodes used in the capacitors are formed from a conductive material deposited on a non-conductive planer substrate, and the substrate is held in a stationary position adjacent to the flexible diaphragm. In one embodiment, the substrate is made from a ceramic material. One of the electrodes can be formed as a circular patch of conductive material deposited on the substrate. The second electrode can be formed as an annular ring of conductive material deposited so as to encircle the first electrode.

The processing circuit can also include a second inductive element also coupled to the sensor capacitors. Upon application of the excitation to the capacitors, a current also flows through the second inductive element. This current is also indicative of the difference between the first and second capacitances. The second current can also be detected to determine the pressure in the chamber.

In one embodiment, the excitation circuit includes an oscillator which applies the AC signal to the capacitances.

The oscillator can also be used to drive a guard contact which is connected to reduce stray capacitances in the sensor and to reduce the effects of inter-electrode capacitance. The oscillator circuit can include an automatic gain control (AGC) circuit to control a level of the AC signal. In one embodiment, the AGC circuit controls the frequency-amplitude product of the signal.

The processing circuit can include various adjustments for calibration and linearization of the measurement. In one embodiment, the processing circuit includes a zero-adjust circuit which calibrates the circuit output to a zero-pressure condition. The processing circuit can also include a scale adjust circuit which adjusts the extreme ends of the circuit signal output at the extreme ends of the pressure scale. That is, the circuit adjusts the processing circuit output at a zero-pressure condition and a full-scale-pressure condition. The processing circuit can also include a linearizing circuit which combines linearizing signals with the signal output of the circuit. In one embodiment, a quadratic term signal and a cubic term signal are generated and combined with the output.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE DRAWINGS

Figure 1A:
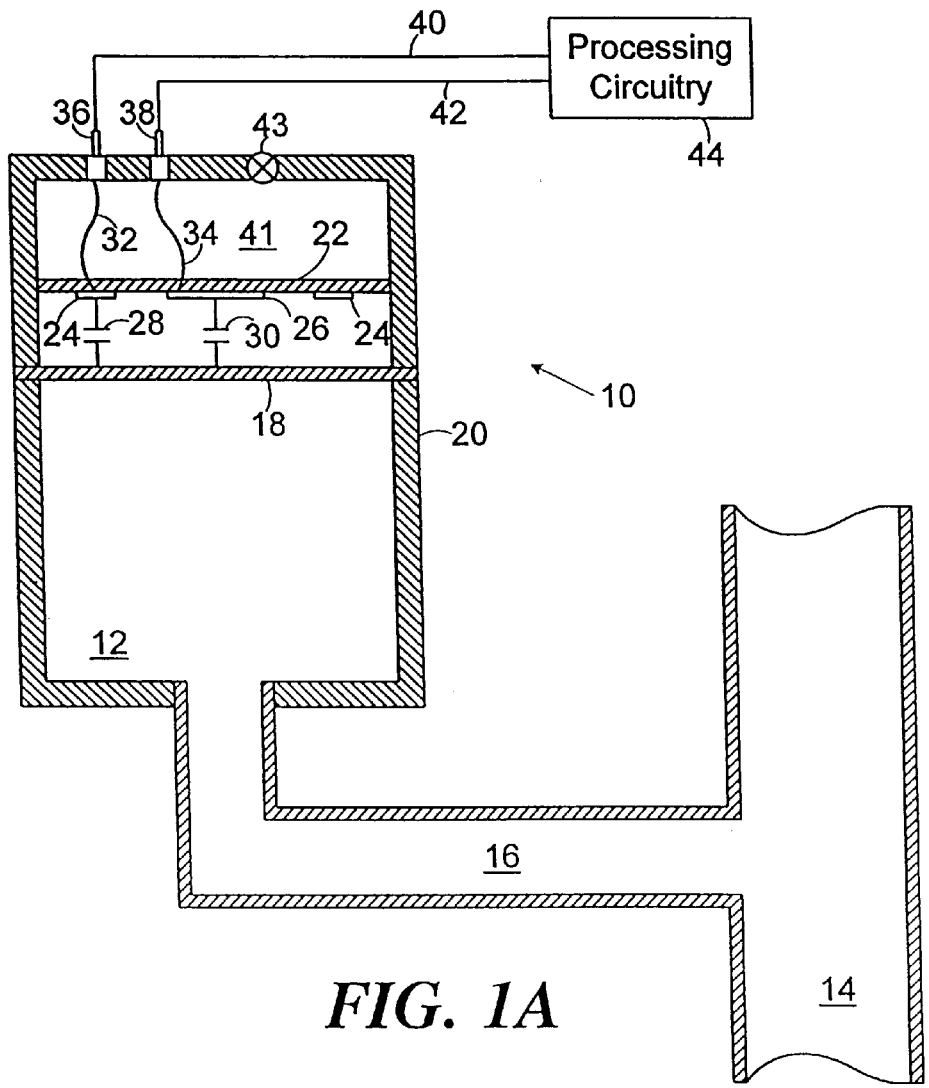
FIG. 1A is a schematic diagram of the capacitor pressure sensor of the invention.

FIG. 1A is a schematic functional diagram which illustrates the capacitive pressure sensor 10 of the invention. The sensor includes a chamber 12 in communication with a region 14 whose pressure is to be determined. The region 14 can be coupled to the sensor chamber 12 by means such as a pipe or conduit 16.

Figure 1B:
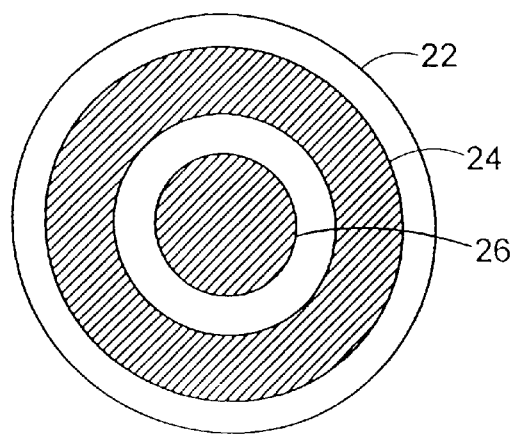
FIG. 1B is a schematic plan view of an electrode configuration in one embodiment of the invention.

The chamber 12 is bounded on one side by an electrically conductive flexible diaphragm 18 fixedly attached to the walls of the sensor body 20. The sensor 10 also includes a substrate 22 also fixedly attached to the walls of the sensor body 20. The substrate 22 has formed thereon a pair of electrodes 24 and 26. FIG. 1B is a top plan view of the substrate 22 and electrodes 24, 26. As shown in the figure, electrode 26 can be in the form of a circular patch formed over the substrate 22. The second electrode 24 can be formed as an annular ring of conductive material which encircles the first electrode 26. The electrodes are formed such as by sputtering a conductive material such as aluminum onto a ceramic substrate or by other known means or using other materials.

Referring again to FIG. 1A, each of the electrodes forms a capacitance with the diaphragm 18. As shown schematically, electrode 24 and the diaphragm form capacitance 28, and electrode 26 and the diaphragm form capacitance 30. The electrodes 24 and 26 are connected by wires 32 and 34, respectively, through the wall 20 of the sensor to terminals 36 and 38, respectively, to provide access for electrical connections. When performing the pressure measurement, the terminals 36 and 38 are connected by wires 40 and 42, respectively, to a processing circuit 44 of the invention.

The value of each capacitance 28, 30 is variable and is dependent upon the separation between the diaphragm 18 and the electrodes 24 and 26. The diaphragm 18 is flexible such that, as pressure inside the chamber 12 increases, the diaphragm flexes toward the electrodes 24 and 26, thus causing an increase in capacitances 28 and 30. The difference between the capacitances 28 and 30 is indicative of the amount of deflection, which is in turn related to the pressure in the chamber 12. The processing circuitry 44, connected to the electrodes 24 and 26, is used to determine the difference between capacitances 28 and 30 and, therefore, the pressure within the chamber 12.

The chamber 41 behind or on the opposite side of the diaphragm 18 is typically set at a reference pressure, depending upon the application in which pressure is being measured. For example, where the region 14 is at a low pressure, such as in semiconductor processing applications, the chamber 41 is partially evacuated to a relatively low pressure, e.g., on the order of $10^{-6}$ Torr. Evacuation of this chamber 41 is accomplished by attaching a suitable vacuum pump to the chamber via a valve 43. In another application where pressures near or above atmospheric pressure are being measured, the valve 43 can be left open such that the chamber 41 is at atmospheric pressure.

Figure 2:
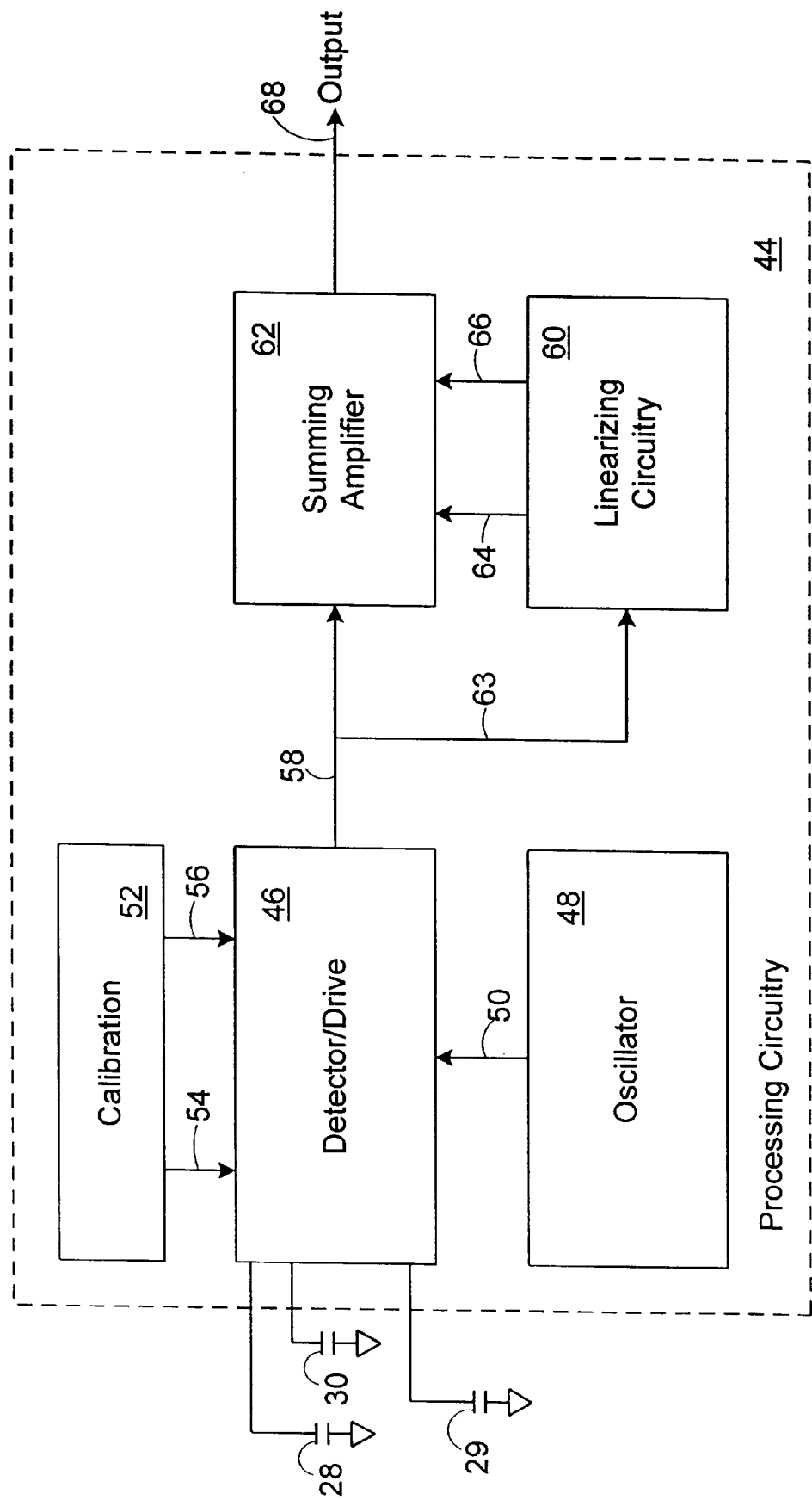
FIG. 2 is a schematic functional block diagram of the processing circuitry of the invention.

FIG. 2 is a schematic block diagram of the processing circuitry 44. As described above, the processing circuitry 44 is coupled to the two capacitances 28 and 30 in the sensor 20. The capacitances 28, 30 are connected to detector/drive circuitry 46. An excitation circuit such as oscillator 48 provides an AC signal on line 50 to the detector/drive circuitry 46, which applies to the capacitors 28 and 30 an AC signal derived from the signal provided by the oscillator 48. As described below in detail, the detector/drive circuitry 46 outputs a signal on line 58 which indicates the difference in capacitance between the two capacitances 28 and 30. As described below in detail, the detector/drive circuitry 46 is also connected to a guard capacitance 29 which represents stray capacitances in the sensor 20.

Various non-linearities affect the pressure measurement of the invention. For example, the relationship between the pressure in the chamber and the deflection of the diaphragm is not completely linear. Also, the relationship between the deflection of the diaphragm and the distance between the diaphragm and the electrodes is not linear, due to the rounded shape of the deflected diaphragm as well as the effects of stretching and other deformation of the diaphragm upon deflection. The most dominant source of non-linearity is the non-linear relationship between the capacitance of a capacitor and the distance between its electrodes. The capacitance varies with the inverse of the distance.

To compensate for these effects, the processing circuit of the present invention applies linearizing terms or signals to the output signal on line 58 from the detector/drive 46. The output signal 58 is applied to linearizing circuitry 60 which generates from the signal some higher-order signals which are then summed with the original signal 58 in summing amplifier 62. The resulting linearized signal is output from the processing circuitry 44 on output signal line 68.

The linearizing circuitry 60 preferrably includes plural multiplying circuits as described below in detail which multiply the incoming signal on line 63 to produce the higher-order signals. In one embodiment, the linearizing circuitry generates a quadratic term signal and a cubic term signal which can be provided to the summing amplifier 62 on lines 64 and 66, respectively. The quadratic and cubic signals are added to the original detector output signal 58 to produce the linearized output signal 68. In one embodiment, the detector output signal at line 58 is a dc signal, the level of which indicates the difference between the capacitances 28 and 30.

In one embodiment, the signal 58 has range between 0 volts and 10 volts DC. Because many sensor parameters can vary from sensor to sensor, the present invention preferrably provides calibration circuitry 52 to ensure that in a zero-pressure condition the circuitry provides a zero-voltage output. The invention provides a zero-adjust signal on line 54 to the detector circuitry 46 which adjusts the output signal to provide the zero output at zero pressure. The calibration circuitry 52 also provides a scale adjust output 56 to the detector circuitry 46 to ensure that the desired voltage extreme, i.e., 10 volts, is achieved at the pressure extreme.

Each of the circuits shown in FIG. 2 in block form will now be described in detail.

Figure 3A:
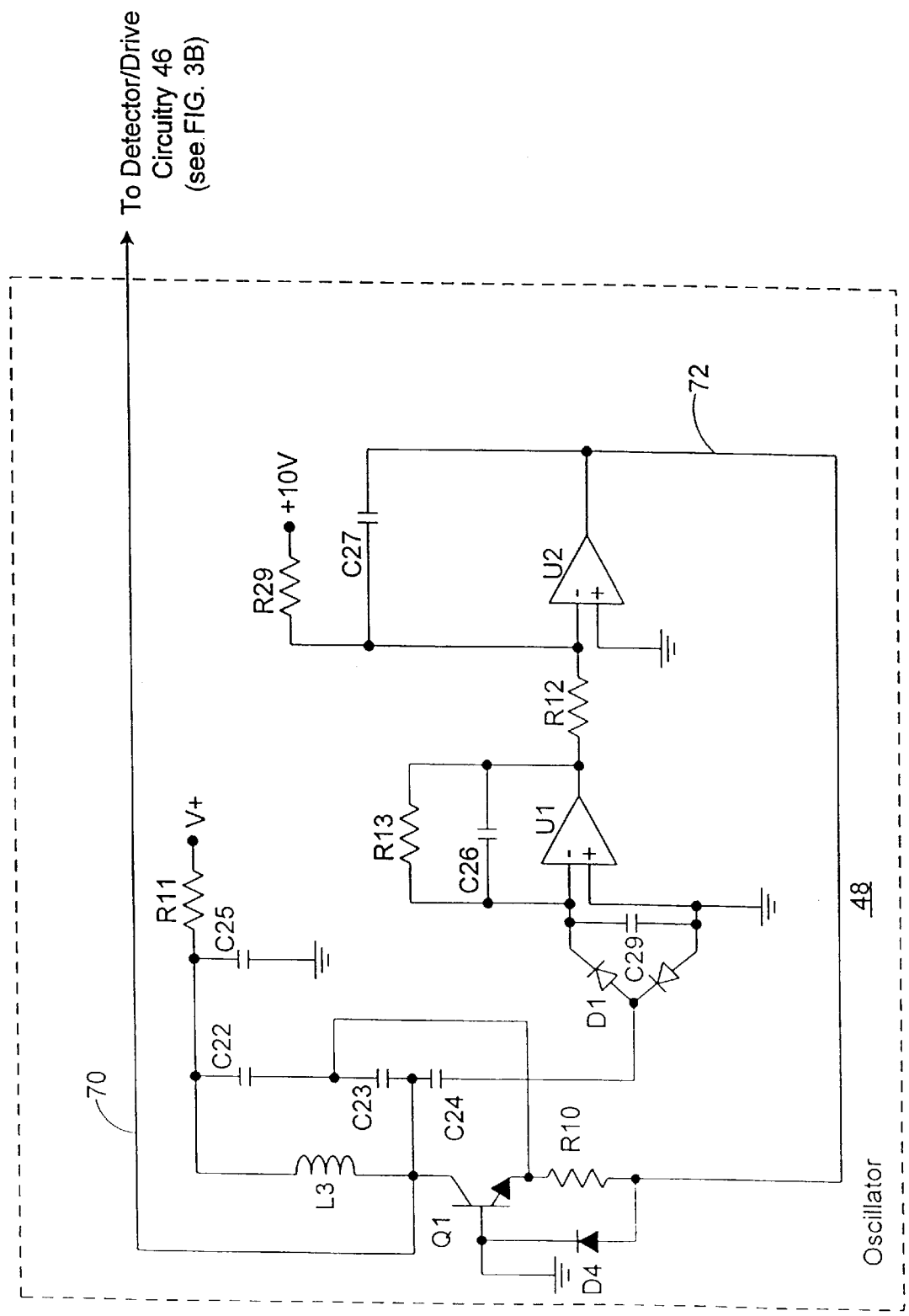
FIGS. 3A–3C contain a detailed schematic diagram of the processing circuitry of the invention.

FIG. 3A is a detailed schematic diagram of the oscillator circuitry 48 of the present invention. Transistor Q1 and the L-C circuit that includes inductor L3 and capacitors C22 and C23 form an oscillator circuit which generates an output AC signal on line 70. The AC signal is connected to the detector/drive circuitry 46 shown in FIG. 3B and described below. Resistor R11 and capacitor C25 couple the DC bias voltage labeled "V+" to the oscillator circuits. The remaining circuitry serves as a peak-to-peak detector and integrator which form an automatic gain control (AGC) loop for the oscillator. The amplitude-frequency product for the oscillator output signal is maintained at a constant level by the feedback loop. An error signal generated by change in the amplitude-frequency product is fed back to the oscillator via line 72 to correct for the drift.

Figure 3B:
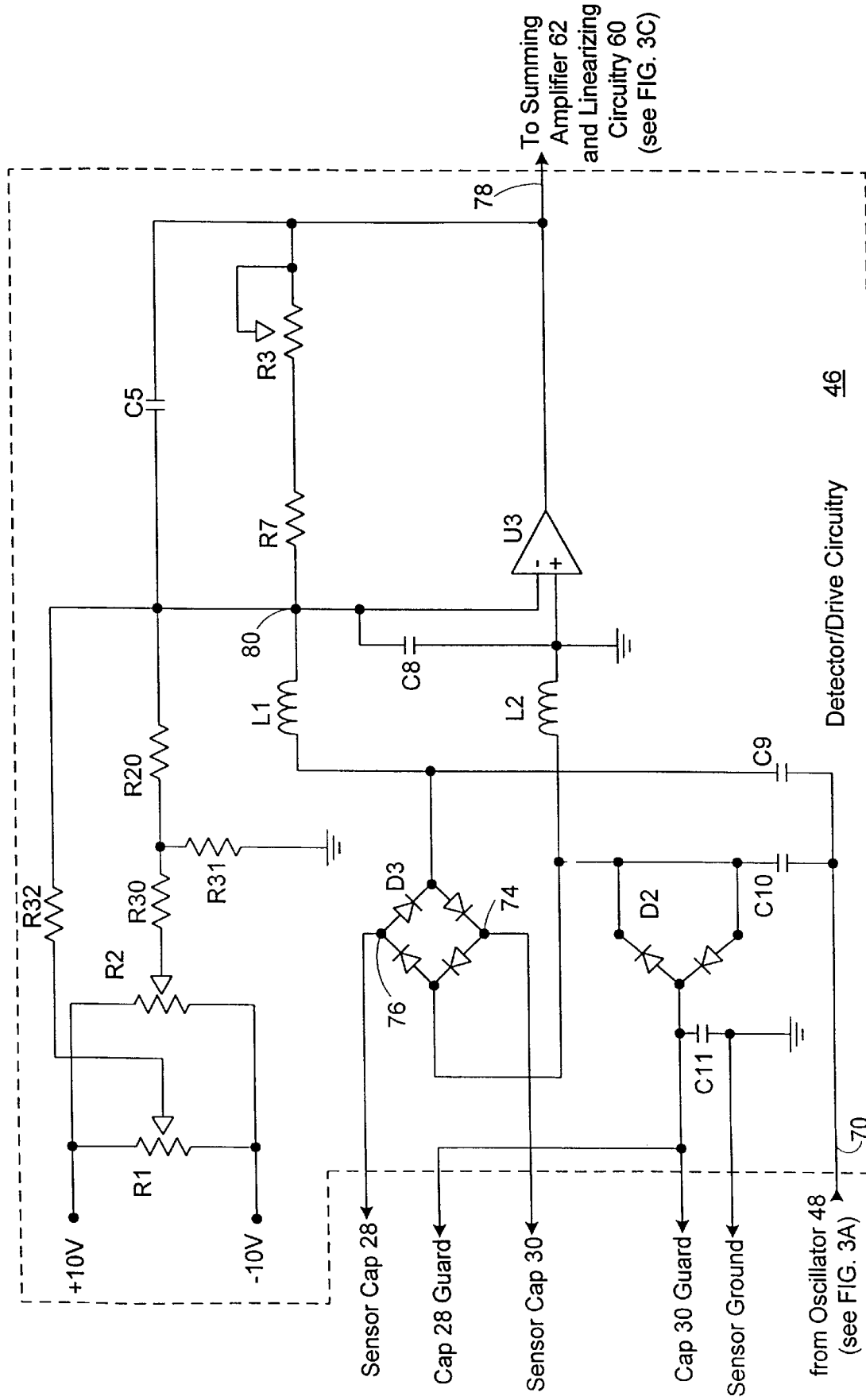

FIG. 3B is a detailed schematic diagram of the detector/drive circuitry 46 and calibration circuit 52 of the invention. The oscillator output signal is received on line 70 from the oscillator 48. The signal is coupled to the circuitry 46 by capacitors C9 and C10 and is applied across four-diode array D3. Nodes 74 and 76 are connected to the sensor capacitances 30 and 28 (see FIG. 2). The result of this excitation is an alternating current through inductors L1 and L2. The levels of these inductor currents are determined by the difference in capacitance between sensor capacitors 28 and 30. Inductor L1 in conjunction with capacitor C8 forms an rf filter that eliminates the high-frequency component of the signal.

The remaining circuitry in the detector/driver 46 is used to detect the current through the inductors L1 and L2 to determine the sensor capacitances. The current is detected by amplifier U3 and its associated circuitry, including capacitors C5 and C8 and resistors R7, R20, R30, R31 and adjustable resistors R2 and R3, all of which serve as a transconductance amplifier or current-to-voltage converter. The output of the amplifier at line 78 is a DC voltage which indicates the average value of the current through the inductors and, therefore, the difference between capacitances 28 and 30.

In one embodiment, the DC voltage at line 78 assumes a value within the range 0 to −10 volts, depending upon the pressure in the chamber. The zero-adjust circuitry of the calibration circuit 52 of the present invention provides calibration settings to provide an accurate voltage range indicative of the range of pressures within the chamber. Variable resistor R1 and resistor R32 inject a zero-adjust current via zero-adjust line 54 at node 80 to adjust the zero-pressure condition for the amplifier. The positive and negative DC supplies, in this embodiment +10 and −10 volts, are applied across the variable resistor R1. At a known zero-pressure condition, the variable resistor R1 is adjusted to set the output on line 78 to 0 volts. The variable resistor R2 and resistors R30, R31, R20 of the zero-adjust circuitry of the calibration circuit 52 provide fine zero adjust via zero-adjust line 54 and capacitor C5 provides filtering. This allows the invention to compensate for variations in sensor capacitances from unit to unit as well as various orientations of the sensor which affect displacement of the diaphragm.

Variable resistor R3, as part of the scale-adjust circuit of the calibration circuit 52 of the invention, uses a scale adjustment signal on line 56 to adjust the full-scale-pressure value for the system at the desired +10 volt level on line 68. At a full-scale-pressure condition, resistor R3 is adjusted such that the output on line 78 is at −10 VDC.

Figure 3C:
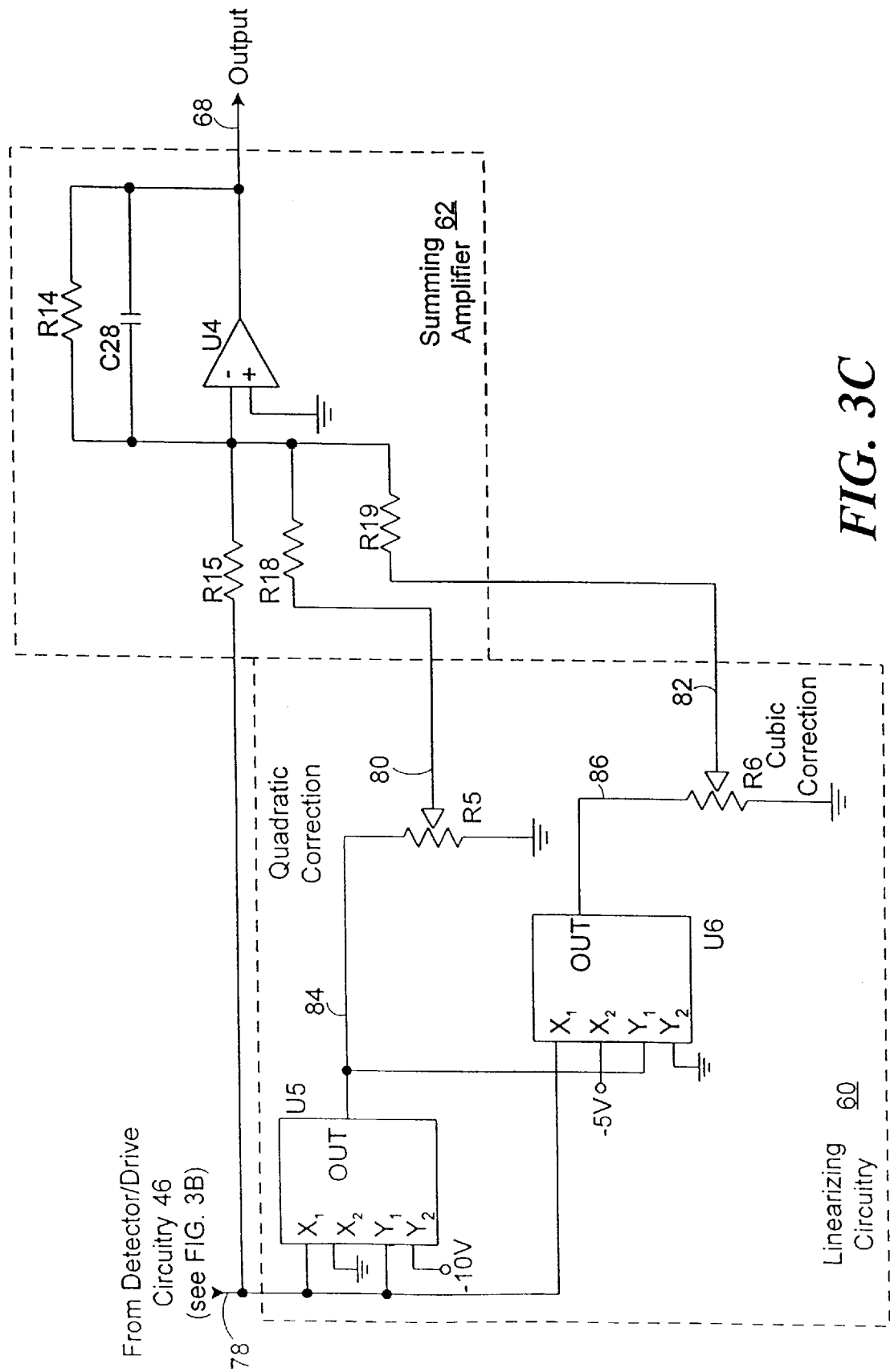

The output signal on line 78 is coupled to linearizing circuitry 60 and summing amplifier 62 to allow for compensation for non-linearities in the measurement and computation. Referring to FIG. 3C, in the summing amplifier 62, the output from the detector/drive circuitry 46 is summed via resistors R15, R18 and R19 and amplifier U4 with higher-order linearizing signals provided by the linearizing circuitry 60. The linearized output is provided on line 68.

In this embodiment, the linearizing circuitry provides two higher-order signals. As shown, the linearizing circuitry 60 provides a quadratic order correction signal on line 80 and a cubic order correction signal on line 82. The linearizing circuitry 60 generates these correction signals using a pair of multiplier circuits U5 and U6. In each multiplier, the output is given by $$\text{OUT} = \frac{(X_1 - X_2)(Y_1 - Y_2)}{10}$$

The output from the detector/drive circuitry 46 on line 78 is connected to the $X_1$ and $Y_1$ inputs of multiplier U5; the $X_2$ input is connected to ground, and the $Y_2$ input is connected to a reference of −10V. The output of multiplier U5 provided on line 84 is coupled to the summing amplifier 62 via an adjustable resistor R5. The resistor R5 is used to adjust the level of quadratic correction signal coupled to the summing amplifier. The quadratic output on line 84 is also coupled to the $Y_1$ input of the second multiplier U6. The $X_1$ input of the second multiplier U6 is provided by the output from the detector drive circuitry 46. The $X_2$ input of U6 is connected to a reference of −5V, and the $Y_2$ input of U6 is grounded. U6 provides a cubic output on line 86 which is the detector/drive output signal 78 cubed. Adjustable resistor R6 sets the level of the cubic correction signal coupled to the summing amplifier circuitry 62.

The resulting output provided at line 68 is a calibrated linearized signal which provides an accurate indication of the difference in capacitance between sensor capacitors 28 and 30 corrected for the non-linearities previously discussed. This signal is used to determine the amount of deflection of the diaphragm and, therefore, the pressure in the chamber 12.

Figure 4:
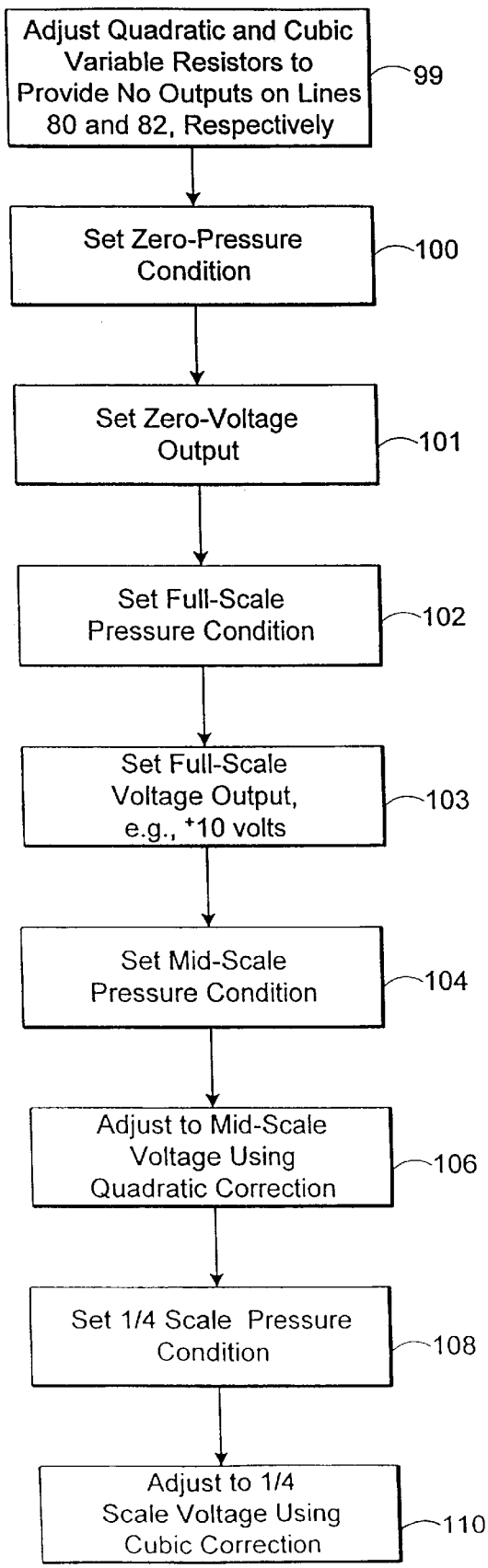
FIG. 4 contains a flow diagram illustrating the flow of the calibration and linearization processes of the invention.

FIG. 4 is a schematic flow diagram illustrating the calibration and linearization processes used in the present invention. In the first step, indicated by reference numeral 99, the quadratic and cubic variable resistors R5 and R6, respectively, are initially adjusted to provide zero output signals at lines 80 and 82, respectively. In step 100, the zero-pressure condition for the sensor is set. Next, in step 101, the zero-adjust circuitry described above is used to set the output of the detector/drive circuitry 46 at line 68 to 0 volts. Next, in steps 102 and 103, the scale-adjust process is performed. In step 102, the full-scale pressure condition is set. In step 103, the scale-adjust circuitry described above is adjusted to set the voltage output at line 68 to the full-scale level, e.g., +10 volts.

The zero-adjust and scale-adjust procedures set the end points of the pressure-voltage response at the ideal levels, e.g., 0 and 10 volts. However, it still remains to linearize the response between these end points. To accomplish this, the quadratic and cubic correction signals are introduced. First, in step 104, the system pressure is set to a mid-scale level. Next, in step 106, the quadratic correction circuitry described above is adjusted to set the voltage output at line 68 shown in FIG. 3C to a mid-scale voltage level, e.g., +5 volts. Next, in steps 108 and 110, the cubic correction term is adjusted to set the response on one side of the midpoint. For example, as shown in step 108, the system pressure can be set to a one-quarter scale level. At this level, the voltage output is set to the desired level for linearity. For example, as shown in step 110, the voltage can be set at the one-quarter scale, e.g., +2.5 volts.

It will be noted that the linearization process is performed outside of the measurement loop. That is, the quadratic and cubic adjustment signals are combined in the output after signal amplification. Therefore, the linearization signals have no effect on the zero-adjust and scale-adjust calibrations. Because these two signal settings are separate, the procedure for calibrating and then linearizing is far more efficient than in prior systems. Since the linearization process has no effect on the zero and scale adjusts, after linearization is performed, there is no need to go back and repeat zero and scale-adjust calibrations. Considerable setting time is eliminated.

The pressure sensor of the invention provides numerous advantages over prior approaches. For example, the detection/drive circuitry of the invention can be operated at high frequency, e.g., 1–10 MHZ, to produce higher capacitor and inductor current. Because the invention detects the high current through the inductor, the system has increased sensitivity and the signal-to-noise ratio of the system is improved. Also, because the invention can operate at high frequency, smaller components can be used, making the invention applicable in settings where small size is advantageous.

The calibration and linearization processes of the invention also provide for a more accurate transducer than prior devices. Because the sensor of the invention is calibrated to adjust the voltage-versus-pressure relationship, non-linearities due to deflection of the transducer diaphragm are corrected. Also, because the linearization is performed open-loop, i.e., without feedback, wideband linearization is achieved. In addition, because the linearization is performed outside of the main system feedback loop, repetitive calibration and linearization steps are eliminated.

While this invention has been particularly shown and described with references to preferred embodiments thereof, it will be understood by those skilled in the art that various changes in form and details may be made therein without departing from the spirit and score of the invention as defined by the following claims.

What is claimed is:

1. A processing circuit for generating a signal indicative of pressure measured by a capacitive pressure sensor, said processing circuit comprising:
   a first interface for connecting to a first capacitance;
   a second interface for connecting to a second capacitance;
   an oscillator circuit for generating a periodic signal;
   an excitation circuit for (i) receiving the periodic signal, (ii) generating from the periodic signal a first periodic excitation signal and a second periodic excitation signal in phase with the first periodic excitation signal, and (iii) simultaneously applying the first and second periodic excitation signals to the first and second capacitances, respectively;
   inductive means, coupled to the first and second capacitances, for conducting a current in response to the excitation of the first and second capacitances, said current being a function of a difference between the first and second capacitances and being a function of the pressure; and
   detector means for generating a signal indicative of said current.

2. The processing circuit of claim 1 further comprising a second inductive means for conducting a second current in response to the excitation, said second current being a function of the difference between the first and second capacitances.

3. The processing circuit of claim 1 further comprising an array of diodes electrically coupled between the first and second capacitances.

4. The processing circuit of claim 1 further comprising a zero-adjust circuit for calibrating the processing circuit to a zero-pressure condition.

5. The processing circuit of claim 1 further comprising a scale adjust circuit for calibrating the processing circuit to a full-scale-pressure condition.

6. The processing circuit of claim 1 further comprising a linearizing circuit for adjusting the signal as a function of the pressure to compensate for a nonlinearity.

7. The processing circuit of claim 6 wherein the linearizing circuit provides a quadratic correction signal to the signal as a function of the pressure.

8. The processing circuit of claim 7 wherein the linearizing circuit provides a cubic correction signal to the signal as a fiction of the pressure.

9. The processing circuit of claim 6 wherein the linearizing circuit provides a cubic correction signal to the signal as a function of the pressure.

10. The processing circuit of claim 1 wherein the oscillator circuit drives a guard contact to reduce stray capacitance.

11. The processing circuit of claim 1 wherein the oscillator circuit includes an automatic gain control (AGC) circuit to control a level of the AC signal.

12. The processing circuit of claim 11 wherein the AGC circuit controls an amplitude-frequency product of the AC signal.

13. A capacitive pressure sensor comprising:
    a chamber;
    a first capacitance and a second capacitance coupled to the chamber, the first and second capacitances varying with a pressure in the chamber; and
    a processing circuit comprising:
       an oscillator circuit for generating a periodic signal,
       an excitation circuit for (i) receiving the periodic signal, (ii) generating from the periodic signal a first periodic excitation signal and a second periodic excitation signal in phase with the first periodic excitation signal, and (iii) simultaneously applying the first and second periodic excitation signals to the first and second capacitances, respectively, inductive means, coupled to the first and second capacitances, for conducting a current in response to the excitation of the first and second capacitances, said current being a function of a difference between the first and second capacitances and being a function of the pressure, and detector means for detecting the current and generating a signal indicative of said pressure.

14. The capacitive pressure sensor of claim 13 further comprising:

an electrically conductive flexible diaphragm coupled to the chamber and adapted to be deflected upon application of the pressure in the chamber to a surface of the diaphragm;

a first electrode in proximity to the diaphragm such that the first electrode and the diaphragm form the first capacitance, the first capacitance being variable upon deflection of the diaphragm; and a second electrode in proximity to the diaphragm such that the second electrode and the diaphragm form the second capacitance, the second capacitance being variable upon deflection of the diaphragm.

15. The capacitive pressure sensor of claim 14 wherein the first and second electrodes comprise a conductive material deposited on a non-conductive substrate.

16. The capacitive pressure sensor of claim 15 wherein the non-conductive substrate comprises a ceramic material.

17. The capacitive pressure sensor of claim 14 wherein one of the first and second electrodes comprises a circular patch of the conductive material and the other of the first and second electrodes comprises an annular ring of the conductive material.

18. The capacitive pressure sensor of claim 17 wherein the one of the first and second electrodes is encircled by the other of the first and second electrodes.

19. The capacitive pressure sensor of claim 13 wherein the processing circuit further comprises a second inductive means for conducting a second current in response to the excitation, the second current being a function of the difference between the first and second capacitances.

20. The capacitive pressure sensor of claim 13 wherein the processing circuit further comprises an array of diodes electrically coupled between the first and second capacitances.

21. The capacitive pressure sensor of claim 13 wherein the processing circuit further comprises a zero-adjust circuit for calibrating the processing circuit to a zero-pressure condition.

22. The capacitive pressure sensor of claim 13 wherein the processing circuit further comprises a scale adjust circuit for calibrating the processing circuit to a full-scale-pressure condition.

23. The capacitive pressure sensor of claim 13 wherein the processing circuit further comprises a linearizing circuit for adjusting the signal as a function of the pressure to compensate for a nonlinearity.

24. The capacitive pressure sensor of claim 23 wherein the linearizing circuit provides a quadratic correction signal to the signal as a function of the pressure.

25. The capacitive pressure sensor of claim 24 wherein the linearizing circuit provides a cubic correction signal to the signal as a function of the pressure.

26. The capacitive pressure sensor of claim 23 wherein the linearizing circuit provides a cubic correction term to the signal as a function of the pressure.

27. The capacitive pressure sensor of claim 13 wherein the oscillator circuit also drives a guard contact to reduce stray capacitance.

28. The capacitive pressure sensor of claim 13 wherein the oscillator circuit includes an automatic gain control (AGC) circuit to control a level of the AC signal.

29. The capacitive pressure sensor of claim 28 wherein the AGC circuit controls an amplitude-frequency product of the AC signal.

30. A method of measuring pressure in a chamber comprising:

coupling a first capacitance and a second capacitance to the chamber such that a difference between the first and second capacitances is a function of the pressure in the chamber;

coupling the first and second capacitances to an inductive element;

generating a periodic signal with an oscillator circuit;

generating from the periodic signal a first periodic excitation signal and a second periodic excitation signal in phase with the first periodic excitation signal;

simultaneously applying the first and second periodic excitation signals to the first and second capacitances, respectively, such that a current passes through the inductive element as a function of the difference between the first and second capacitances;

detecting the current through the inductive element; and generating a signal indicative of said current and of the pressure in the chamber.

31. The method of claim 30 further comprising:

coupling an electrically conductive diaphragm to the chamber, the diaphragm being adapted to be deflected upon application of the pressure in the chamber to a surface of the diaphragm;

providing a first electrode in proximity to the diaphragm to form the first capacitance such that the first capacitance is variable upon deflection of the diaphragm; and providing a second electrode in proximity to the diaphragm to form the second capacitance such that the second capacitance is variable upon deflection of the diaphragm.

32. The method of claim 31 wherein the steps of providing a first electrode and providing a second electrode comprise depositing a conductive material on a non-conductive substrate.

33. The method of claim 31 wherein:

providing one of the first and second electrodes comprises forming a patch of conductive material on a non-conductive substrate; and providing the other of the first and second electrodes comprises forming an annular ring of the conductive material on the non-conductive substrate.

34. The method of claim 33 wherein the non-conductive substrate comprises a ceramic material.

35. The method of claim 33 wherein the one of the first and second electrodes is encircled by the other of the first and second electrodes.

36. The method of claim 30 further comprising coupling the first and second capacitances to a second inductive element such that a second current through the second inductive element is a function of the difference between the first and second capacitances.

37. The method of claim 30 further comprising coupling the first and second capacitances to an array of diodes.

38. The method of claim 30 further comprising providing a zero-adjust calibration circuit for setting a zero-pressure condition.

39. The method of claim 30 further comprising providing a scale adjust calibration circuit for setting a full-scale-pressure condition.

40. The method of claim 30 further comprising providing a linearizing circuit to compensate for a nonlinearity.

41. The method of claim 40 wherein the linearizing circuit provides a quadratic correction signal to the signal as a function of the pressure.

42. The method of claim 41 wherein the linearizing circuit provides a cubic correction signal to the signal as a function of the pressure.

43. The method of claim 40 wherein the linearizing circuit provides a cubic correction signal to the signal as a function indicative of the pressure.

44. The method of claim 30 further comprising driving a guard contact with the oscillator circuit to reduce stray capacitance.

45. The method of claim 30 further comprising providing the oscillator circuit with an automatic gain control (AGC) circuit to control a level of the AC signal.

46. The method of claim 45 further comprising controlling an amplitude-frequency product of the AC signal.

* * * * *

UNITED STATES PATENT AND TRADEMARK OFFICE
CERTIFICATE OF CORRECTION

PATENT NO.: 5,942,692

DATED: August 24, 1999

INVENTOR(S): Wayne C. Haase, et al.

It is certified that error appears in the above-identified patent and that said Letters Patent is hereby corrected as shown below:

Claim 8, column 8, line 46, delete "fiction" and substitute therefor -- function --.

Signed and Sealed this

Twenty-fifth Day of January, 2000

Attest:

Attesting Officer

*Acting Commissioner of Patents and Trademarks*